Figure 1:
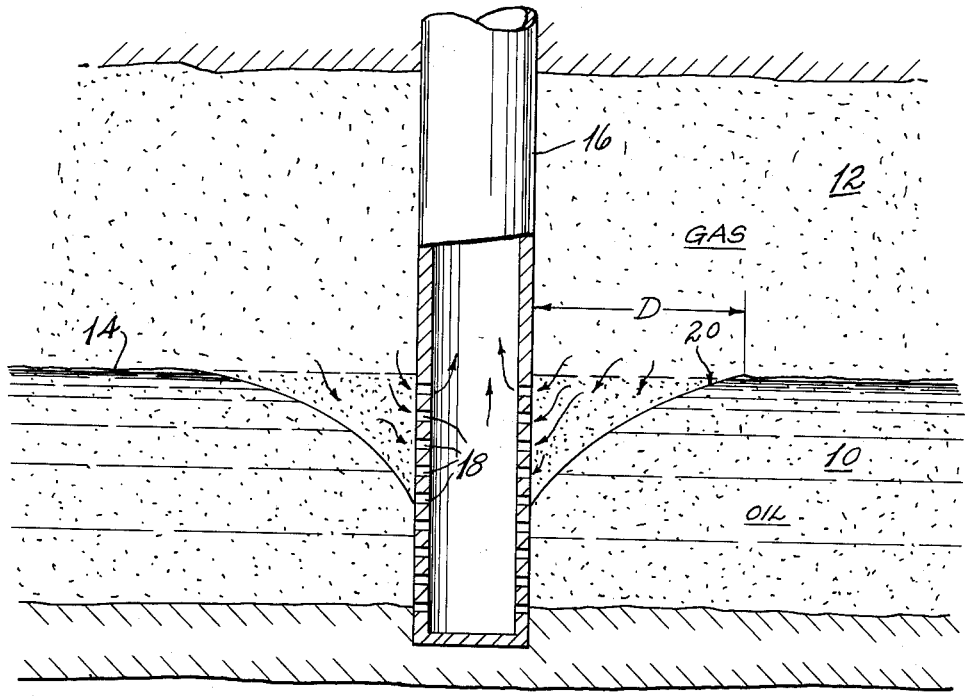

July 26, 1955

J. C. ALLEN 2,713,906

PREVENTING OF GAS CONING IN THE PRODUCTION
OF OIL FROM COMBINATION RESERVOIRS

Filed Dec. 31, 1952

2 Sheets-Sheet 1

INVENTOR.
JOSEPH C. ALLEN
BY
ATTORNEY

INVENTOR.
JOSEPH C. ALLEN
BY
ATTORNEY

United States Patent Office 2,713,906
Patented July 26, 1955

2,713,906

PREVENTING OF GAS CONING IN THE PRODUCTION OF OIL FROM COMBINATION RESERVOIRS

Joseph C. Allen, Bellaire, Tex., assignor to The Texas Company, New York, N. Y., a corporation of Delaware Application December 31, 1952, Serial No. 329,042

8 Claims. (Cl. 166—32)

The present invention relates to the production of liquid petroleum hydrocarbons from a subsurface combination reservoir comprising a body of liquid petroleum overlaid or surmounted by a gaseous phase of hydrocarbons; that is a so-called gas cap.

The present invention has specific application to the problem of recovering oil selectively from the subsurface body of liquid without simultaneously withdrawing substantial quantities of gas from the overlying gas phase. More particularly, it contemplates avoiding the so-called "gas coning," in accordance with which gas from the overlying gas cap is drawn down into the region normally occupied by the oil, so that a well opening into the formation at a point below the normal upper level of the oil pool, produces excessive gas along with the oil.

Gas coning is believed to result from the fact that in the minute interstices of a producing formation just about the well bore gas tends to flow more readily than oil, due to its lower viscosity. Therefore, as oil is drawn into the well hole at substantial rates, the oil immediately about the well bore tends to be replaced in increasing measure by gas flowing downwardly from the gas cap above, resulting in the progressively increased ratio of produced gas-oil as production rates are increased.

In accordance with the present invention, this is overcome by selectively blocking the formation approximately at the plane of the interface between the normal upper surface of the liquid oil and the overlaying gas cap about the well bore. Such blocking or plugging of the formation is effected by localized, selective disposition of asphaltic or bituminous material at the liquid-gas interface.

The terms "asphaltic material" or "bituminous material" as used herein mean typical, resinous, asphaltic, carbenic, hydrocarbons or asphalts, pitches and tars of plastic or solid nature, effective to plug the tiny interstitial voids of a typical limestone or sandstone producing formation, and prevent the downflow of gas. Therefore, downflow of gas is blocked and liquid hydrocarbons can be continuously withdrawn from below this barrier at the desired production rate without production of overlying gas.

Selective deposition of the asphaltic layer in the horizontal plane of the normal gas-oil interface at the upper level of the oil pool is effected by injecting asphaltic material into the formation just below said liquid surface as an asphalt-rich solution in an organic solvent or diluent compatible with the reservoir oil and from which the asphaltic substance is precipitated by contact with the reservoir gas.

Sufficient of the solvent-asphalt solution is injected to displace the reservoir oil a substantial distance radially beyond the well bore at the interface, that is, to drive the oil laterally outwardly and substitute for the oil at the gas-oil interface a solvent rich in asphalt which thus makes interfacial contact with the reservoir gas.

In accordance with the present invention, it has been found that contact with high pressure reservoir gas results in selective de-asphalting of asphalt-rich solutions, by virtue of which the asphaltic material is precipitated in the pores of the formation. Whether this precipitation is effected by vaporization of the solvent into the hydrocarbon reservoir gases or by a de-asphalting effect of the light hydrocarbons present in such gas, or whether it is due to some other cause or causes not known, in actuality the precipitation occurs readily under the typical elevated pressures occurring in ordinary subsurface combination petroleum reservoirs.

For example, injection of a concentrated solution of asphalt in carbon tetrachloride into a typical mixture of separator gas and separator liquid produced from a Gulf Coast condensate reservoir and held at a pressure of 5900 p. s. i. and 274° F., corresponding to typical reservoir conditions, resulted in immediate precipitation of the asphaltic solid. Moreover, the precipitate was free from the gloss and tackiness of the original asphalt and highly effective as a plugging material. In this experiment, the carbon tetrachloride-asphalt solution was prepared by saturating the solvent and filtering the mixture, the solution containing about 23% of asphalt.

The treating solution is freely miscible with formation oil under subsurface reservoir conditions without precipitation or impairment of oil flow in the interstices of the oil zone. Upon resumption of flow, the oil flows back into the well bore driving ahead of it the treatment fluid. Thereafter the oil layer or column about the well bore is protected by an overlying impervious layer resulting from precipitation of asphalt in the formation pores.

As above intimated the liquid solvent diluent carrier of the asphaltic material may be any suitable solvent for the asphalt compatible with reservoir oil and capable of dissolving a substantial amount of asphalt. Such, for example, are carbon tetrachloride, benzene, aromatic kerosenes or gas oils, or other aromatic liquid fractions, and, in general, hydrocarbon oils of low characterization number, below 9, for example. Advantageously, the asphalt carrier or solvent may comprise the so-called stock tank oil, namely liquid oil, produced from the formation in question. In general, therefore, the solvent or diluent may comprise any hydrocarbon liquid having substantial solubility for asphalt and may also comprise organic solvents in general which similarly dissolve asphalt and are compatible with reservoir oil.

The present invention is particularly advantageous from the standpoint of maximizing oil production from combination reservoirs where production of the overlying gas may tend to seriously lower formation pressure and impair ultimate oil recovery. By cutting off the gas flow into the well the pressure is conserved and the field more effectively produced.

Moreover, production rates, as above indicated, can be maintained at a higher level. For example, referring to the attached drawing, Fig. 1 diagrammatically represents a production well bottomed into a combination reservoir comprising porous formations, the lower portion of which contains a body of liquid oil as at 10 rising to an upper liquid level 14. The interstitial space above the oil is occupied by a typical gas phase 12 of hydrocarbons. An interface between the gas phase and the upper liquid surface of the oil therefore exists at 14. A production pipe or casing 16 extends downwardly into the formation from a surface location, not shown, and is perforated within the oil pool by numerous apertures 18 to permit oil to flow into the pipe 16 from the formation. The tube 16 may be provided with a pump, not shown, to draw oil from the formation and force the produced oil to the surface. On the other hand, the pump may be omitted as indicated where the subsurface pressure is sufficient to force the oil into the pipe 16 and deliver the produced oil to the well head.

At substantial production rates, however, a substantial pressure gradient may be set up radially outwardly from the well bore due to flow restriction through the minute interstices of the formation. In effect, oil is withdrawn from the space immediately about the well bore at a rate greater than that at which it is readily replenished from the surrounding reservoir. Therefore, the level of oil progressively decreases in the vicinity of the casing 16 in a manner more or less diagrammatically indicated by the curved line 20.

Therefore, the oil previously present in the pores of the formation just above line 20 tends to be replaced by gas which flows into the casing and is produced with the oil, resulting in the condition known as coning.

Manifestly, as the rate of oil production increases, gas coning increases so that the ratio of produced gas to oil goes up correspondingly.

Figure 2:
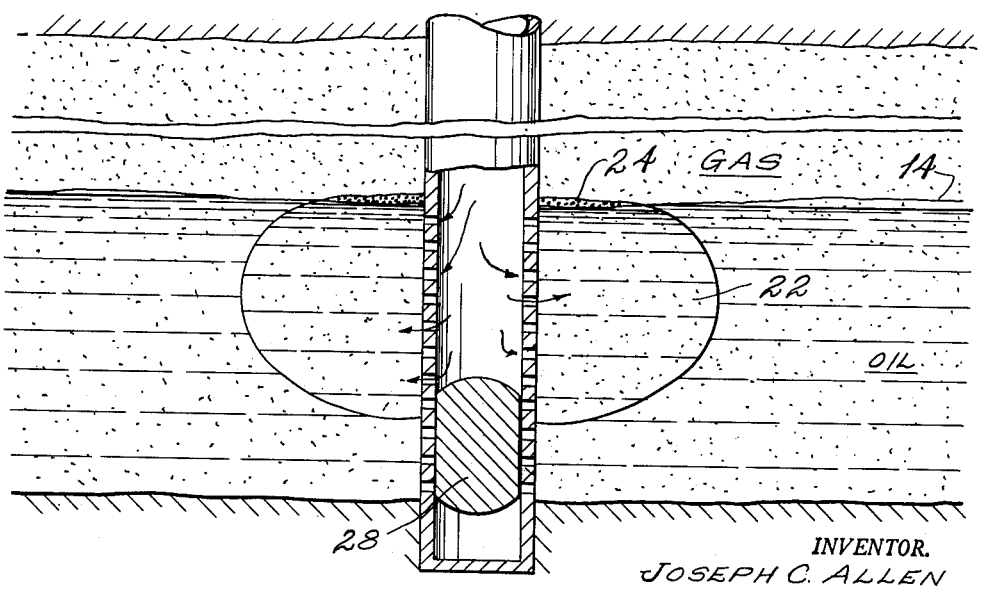
Figure 3:
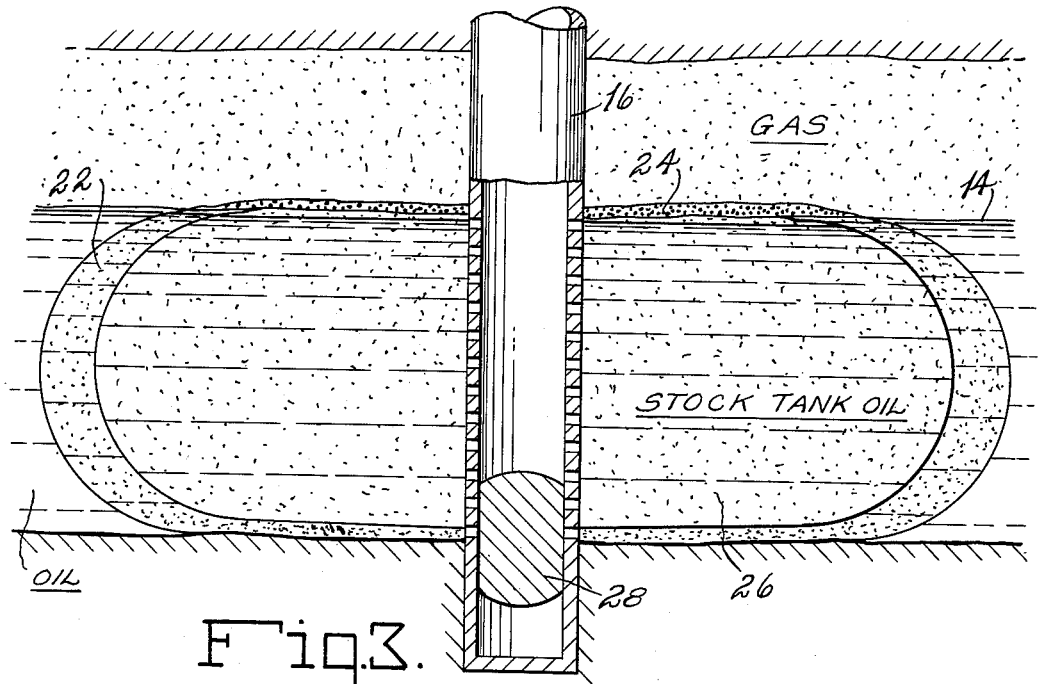

Figs. 2 and 3 exemplify treatment of the formation in accordance with the present invention. In accordance with this treatment a substantial quantity of asphalt-rich solution is pumped down the casing, by any suitable pumping means not shown, and forced out through the perforations into the formation. Normally, in a formation of uniform porosity, the injected liquid flows radially outwardly in the form of an oblate spheroid which displaces the formation oil ahead of it, as indicated by reference numeral 22. As the upper surface of the spheroid spreads out along the plane of the normal equilibrium upper level of the liquid oil pool, it forms an interface with the petroleum gas phase 12. As above indicated, this results in selective precipitation of asphalt along the interface as at 24. In ths interface precipitation of the asphalt in the typically minute interstices readily forms barriers which are effectively impermeable to gas. As the barrier is formed it further tends to flatten the bubble or spheroid as illustrated, further extending the area of precipitation.

Injection of the treating solution 22 is advantageously followed up by a succeeding injection of stock tank oil. For example, a specific predetermined volume or so-called "slug" of treating solution is supplied to the casing at the surface followed directly by a larger volume of the stock tank oil flowing down the casing 16 and into the formation in successive, segregated order. Therefore, as shown in Fig. 3, the stock tank oil, as at 26, forces the treating solution yet further out into the formation, thus greatly enlarging the radial region treated and extending the area of interfacial contact between the asphalt-rich solution and the gas phase. As a result the impermeable region resulting from this interface at 24 is extended considerably further.

Preferably, pressure conditions are maintained to hold or retain the system in essentially the condition shown in Fig. 3 for a period of about 24 hours or greater and assure maximum asphalt precipitation at the interface. Thereafter, pressure is released and the oil permitted to flow into the well bore, flushing before it the excess treating solution 22 and stock tank oil 26. Accordingly, therefore, shortly after resumption of flow the region about the well bore and below the normal upper liquid level 14, resumes its original condition of oil saturation. This follows from the fact that the asphalt is completely soluble and otherwise compatible with the formation oil, and, therefore, the permeability is not altered in any respect by passage of the treatment reagents. Packer 28 restricts injection to the upper part of the oil pool.

Figure 4:
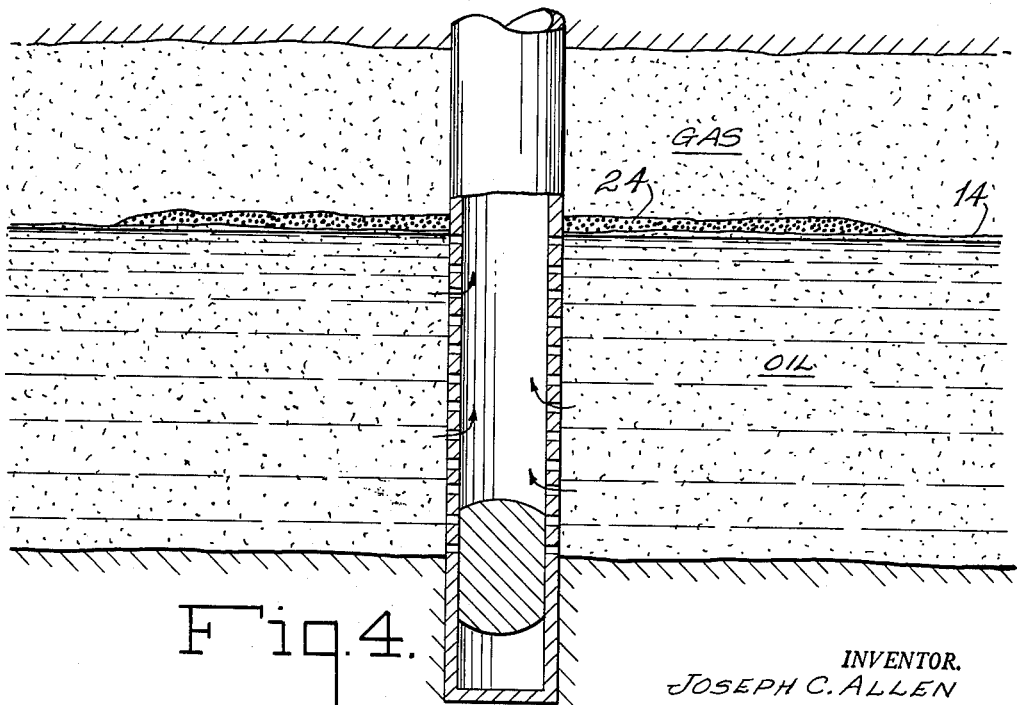

Fig. 4 illustrates more or less diagrammatically the conditions prevailing about the well bore upon resumption of production at a substantial rate. It is to be noted at this time the impermeable barrier 24 seals or closes off the upper portion of the formation wherein coning would otherwise occur. Therefore, gas is prevented from flowing downwardly to the production level and into the perforations 18 of the conduit 16. As a result, the drawdown imposed on the well may be increased materially to withdraw oil from the pool 10 at the desired rate without encountering downflow of gas phase material from the zone thereabove.

In accordance with one specific example, a producing well casing extends into a Rhodessa lime producing formation containing an oil column surmounted by a condensate cap, and is perforated just below the upper level of the oil column.

The actual solution gas-oil ratio of the liquid oil was equal to about 1300 cubic feet per barrel. However, while being produced at the rate of 190 barrels per day, the actual gas-oil ratio of the product delivered at the surface was 4728 cubic feet per barrel. Moreover, the gas-oil ratio of the production varied directly with the producing rate. This, therefore, establishes that substantial quantities of gas from the overlying structure were "coning" into the normally oil bearing strata about the well bore.

In accordance with the present invention, a treating solution is made up as above by saturating carbon tetrachloride with E–3874–VSS Hawkins asphalt. The resulting liquid is filtered and thereafter pumped down the casing and out into the formation in the amount of about 15 barrels.

The formation in question has a porosity of approximately 20%, about 20% of which is occupied by interstitial, connate water. Therefore, the actual volume of formation saturated by the injected 15 barrels of solution is equivalent to 94 barrels or, in other words, a sphere having a radius of about 5 feet. Injection of the treating fluid is followed by injection of about 50 barrels of stock tank oil and the pressure is adjusted to hold the treating liquids in the formation under equilibrium conditions for a period of about 24 hours.

Thereafter, the pressure is released at the well head and production resumed. After the well is flushed and in production, samples taken at a 200 barrel per day rate of liquid oil production, establish a gas-oil ratio substantially less than 2000 cubic feet per barrel of oil.

In the above example the carbon tetrachloride may be substituted by stock tank oil or any other liquid which dissolves substantial amounts of asphaltic material and is compatible with formation oil, as previously indicated. The solvent is advantageously enriched with maximum quantities of asphalt; that is to a substantial condition of enrichment, preferably appropriately saturated. In any event, the solvent-asphalt mass being completely miscible with the liquid formation oil passes through the formation without precipitation, except at the interface with the overlying gas phase.

As also above indicated, the precipitate is characterized by a firmness, rigidity and resistance to solvents far exceeding that of the original asphalt. For example, in the case of the experiment first described above, repeated washings with carbon tetrachloride, benzene, soap and water, and mechanical scrubbing over a period of three days failed to completely remove the deposit. Therefore, it is evident that the impermeable layer is essentially permanent in nature and resistant to removal by oil flowing in contact therewith.

In accordance with another example of a combination reservoir in which the dissolved gas-oil ratio of the liquid oil phase is about 1000 cubic feet per barrel of produced oil, the well actually produces about 13,000 cubic feet of gas per barrel of oil when flowing at its normal rate. In this particular case the producing sand was about 100 feet in vertical thickness, of which only the lowermost 10 feet were saturated with oil. The casing was perforated in the oil column. The treatment of this well is the same as in the above example, the asphalt solution being injected below the top of the oil column in sufficient amount to displace the oil about the well bore. After completion of the treatment, samples of the produced oil and gas establish a gas-oil ratio of approximately 1500 cubic feet per barrel at the normal rate of flow.

The present process is particularly advantageous in connection with combination reservoirs subject to pressures above, for example, 2000 pounds, and preferably above 3000 p. s. i., and temperatures ranging from atmospheric to about 300° F. It is particularly effective in connection with a reservoir in which the retrograde phenomena prevail. When the gas phase is in the range of retrograde vaporization, solvents such as carbon tetrachloride and aromatic hydrocarbons which are not otherwise present in the overlying gas phase, readily vaporize into the gas cap forming a retrograde enriched gas with the vaporized solvent. This further expedites the precipitation of asphaltic or bituminous material at the area of enrichment just above the injected liquid solvent.

It is desirable, as will be evident from the foregoing, that the treating solution be injected just below the upper level of the normal oil-gas interface at a distance such that the formation oil will be substituted by an interface between the treating solution and gas about the well bore essential to precipitation of the dissolved asphalt.

Mention is made above of the use of stock tank oil for displacing the treating solution out into the formation. Instead of stock tank oil, may be employed any other liquid oil or solvent compatible with the formation oil and with the treating solution.

It will be understood that if, subsequent to production under conditions illustrated in Fig. 1 of the drawing, production is then terminated, the position of the gas-oil interface will again rise to the level 14 above the well bore; in other words, the oil will return to its original equilibrium level as withdrawal through perforations 18 stops. However, it frequently happens that small pockets of gas may tend to be trapped in and about the vicinity of the perforations 18 by the returning oil. If contacted by an asphalt-containing treating solution, such gas pockets may tend to precipitate asphalt below the normal gas-oil interface level and undesirably restrict oil-flow to the well bore. In such cases, therefore, it is advantageous to first inject a substantial volume or slug of stock tank oil or other compatible and essentially asphalt-free liquid solvent in order to drive or sweep the gas out of the region to be treated. In this manner, premature precipitation of asphalt by entrapped gas pockets or bubbles is prevented, thus avoiding undesired impairment of oil flow through the formation.

Obviously many modifications and variations of the invention as herein set forth may be made without departing from the original spirit and scope thereof, and only such limitations should be imposed as are indicated in the appended claims.

I claim:

1. In the production of liquid petroleum by means of a production well extending into a subsurface producing formation comprising a combination reservoir in which a body of liquid hydrocarbons is overlaid by gas phase hydrocarbons said well communicating with the formation below the normal upper surface of the liquid oil and wherein a substantial amount of overlying gas is produced with the oil, the improvement which comprises forming a selective impermeable barrier of asphaltic material in the region of the normal interface between the gas and the oil by injecting into the formation from said well bore a liquid solvent which is compatible with the reservoir oil and which contains a substantial quantity of asphaltic material dissolved therein, forcing said injected solution from the well bore into the formation so that the formation oil is displaced outwardly from the well bore thereby creating a substantial interfacial area of contact between the injected solution and the overlying gas phase effective to precipitate asphalt from said treating solution and plug the interstices of the formation at approximately the normal interface between the gas and oil, and thereafter flushing the formation of injected solution and producing liquid oil from the treated formation with a substantially decreased production of gas.

2. The method according to claim 1 wherein the pressure existing in said subsurface formation is above about 1000 p. s. i.

3. The method according to claim 1 wherein the pressure existing in said subsurface formation is above about 3000 p. s. i.

4. The method according to claim 1 wherein said liquid solvent comprises an aromatic hydrocarbon having a substantial solubility for said asphaltic material and compatible with the formation oil.

5. The method according to claim 1 wherein said solvent comprises carbon tetrachloride.

6. The method according to claim 1 wherein said solvent comprises oil recovered from said formation.

7. The method according to claim 1 wherein said injection of asphalt-rich solvent is followed by injection of a substantial quantity of essentially asphalt-free solvent.

8. In the production of liquid petroleum by means of a production well extending into a subsurface producing formation comprising a combination reservoir in which a body of liquid hydrocarbons is overlaid by gas phase hydrocarbons, said well communicating with the formation below the normal upper surface of the liquid oil and wherein a substantial amount of overlying gas is produced with the oil, the improvement which comprises injecting into said formation at a location just below the normal upper surface of said liquid oil a solution of asphaltic material contained in a liquid solvent compatible with the formation oil and from which the asphaltic material precipitates upon contact with the overlying gas phase hydrocarbons, forcing a substantial quantity of said solution into the formation to displace the formation oil a substantial distance radially outwardly from the well bore, thereby bringing the injected solution into contact with the overlying gas phase hydrocarbons so that substantial precipitation of asphaltic material from said solution occurs in the interstices of the formation at about the normal upper surface of the formation oil, maintaining said contact for a sufficient period of time to effect substantial plugging of the formation pores at about said surface and thereafter withdrawing the treating solution and producing liquid oil from said well at a decreased gas-oil production ratio.

References Cited in the file of this patent

UNITED STATES PATENTS

| | | |
|---|---|---|
| 2,151,029 | Henst | Mar. 21, 1939 |
| 2,223,789 | Limberg | Dec. 3, 1940 |
| 2,258,829 | Berge | Oct. 14, 1941 |
| 2,272,673 | Kennedy | Feb. 10, 1942 |
| 2,377,529 | Stephenson | June 5, 1945 |